United States Patent [19]
Reich et al.

[11] 3,918,352
[45] Nov. 11, 1975

[54] DEVICE FOR FEEDING A PRESSURE MEDIUM TO A ROTATING DOUBLE ACTING PRESSURE CYLINDER FOR ACTUATING CLAMPING TOOLS

[75] Inventors: Kurt Reich, Dusseldorf; Hans Blättry, Meerbusch, both of Germany

[73] Assignee: Paul Forkardt Kommanditgesellschaft, Dusseldorf, Germany

[22] Filed: Feb. 15, 1974

[21] Appl. No.: 442,848

Related U.S. Application Data
[63] Continuation of Ser. No. 298,613, Oct. 18, 1972, abandoned.

[30] Foreign Application Priority Data
Oct. 19, 1971 Germany............................ 2151938

[52] U.S. Cl. ........................ 92/106; 91/420; 279/4; 285/190
[51] Int. Cl............................................. F01b 31/00
[58] Field of Search ........... 92/106; 279/4; 285/136, 285/190; 91/420

[56] References Cited
UNITED STATES PATENTS

| | | | |
|---|---|---|---|
| 2,599,664 | 6/1952 | Sloan | 285/134 X |
| 2,710,598 | 6/1955 | Baas | 285/136 X |
| 2,938,500 | 5/1960 | Damijonaitis | 92/106 X |
| 3,130,645 | 4/1964 | Hohwart | 92/106 X |
| 3,169,777 | 2/1965 | Cull | 279/4 |
| 3,369,464 | 2/1968 | Blattry | 279/4 X |
| 3,451,314 | 6/1969 | Smrekar | 279/4 X |
| 3,481,614 | 12/1969 | Reich | 279/4 |
| 3,516,680 | 6/1970 | Andre | 279/4 |
| 3,545,342 | 12/1970 | Hiestand | 92/106 |
| 3,659,863 | 5/1972 | Buttner | 279/4 |

*Primary Examiner*—Martin P. Schwadron
*Assistant Examiner*—Abraham Hershkovitz
*Attorney, Agent, or Firm*—Walter Becker

[57] ABSTRACT

A device for feeding a pressure medium to a rotating double acting pressure medium operable cylinder piston assembly for actuating clamping tools, especially chucks on machine tools, which is provided with a rotatable member, e.g., a housing or a chuck, and with a feeding ring mounted on the rotatable member and held stationary relative thereto. The feeding ring has an I-shaped cross section with a double groove on both sides of the web with annular diaphragms slightly axially displaceable in the double grooves for cooperation with the respective oppositely located annular surfaces of the rotatable member while an adjacent annular groove in the rotatable member is in communication with one of the piston sides of the piston to be controlled.

5 Claims, 6 Drawing Figures

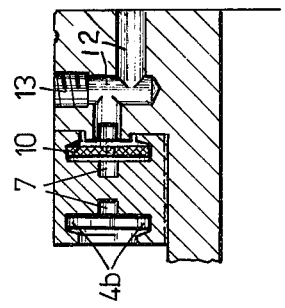
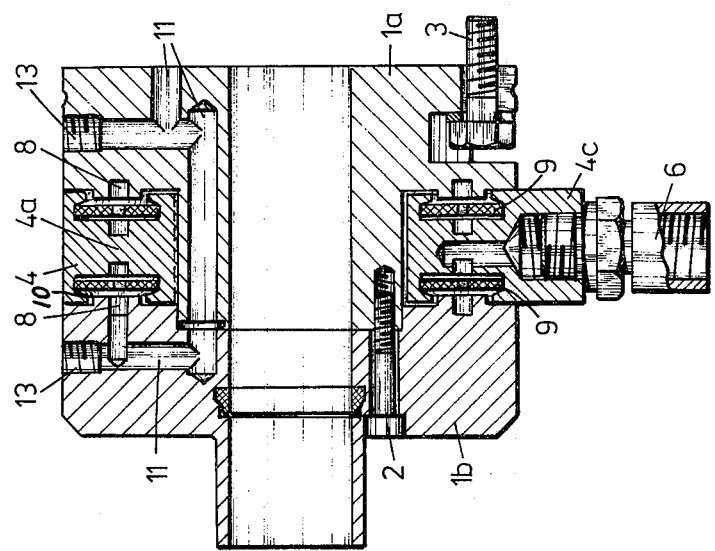
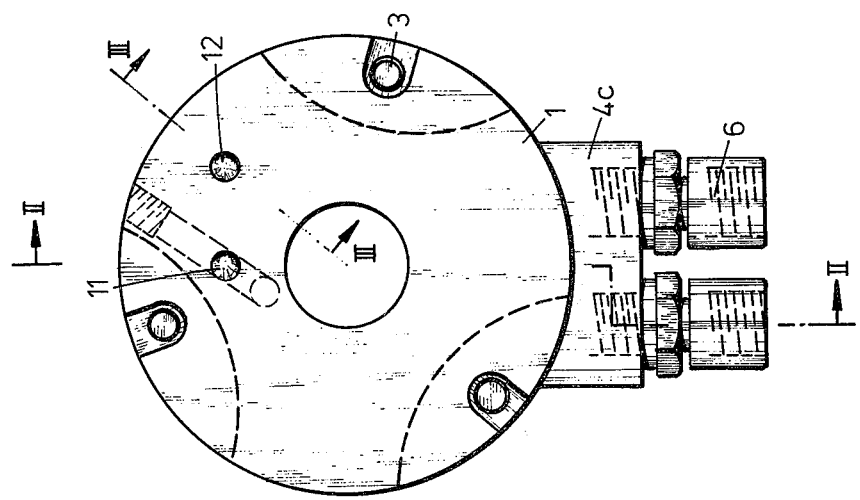

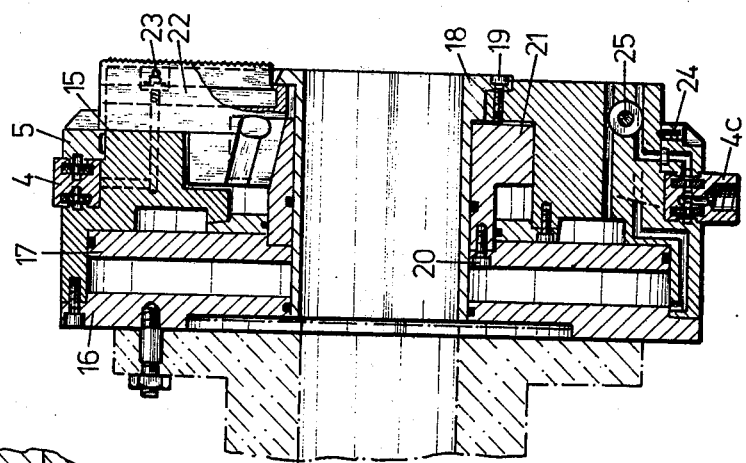
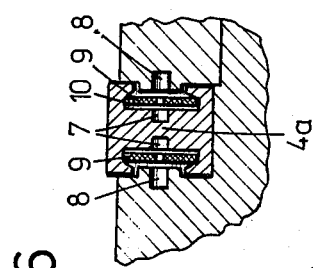
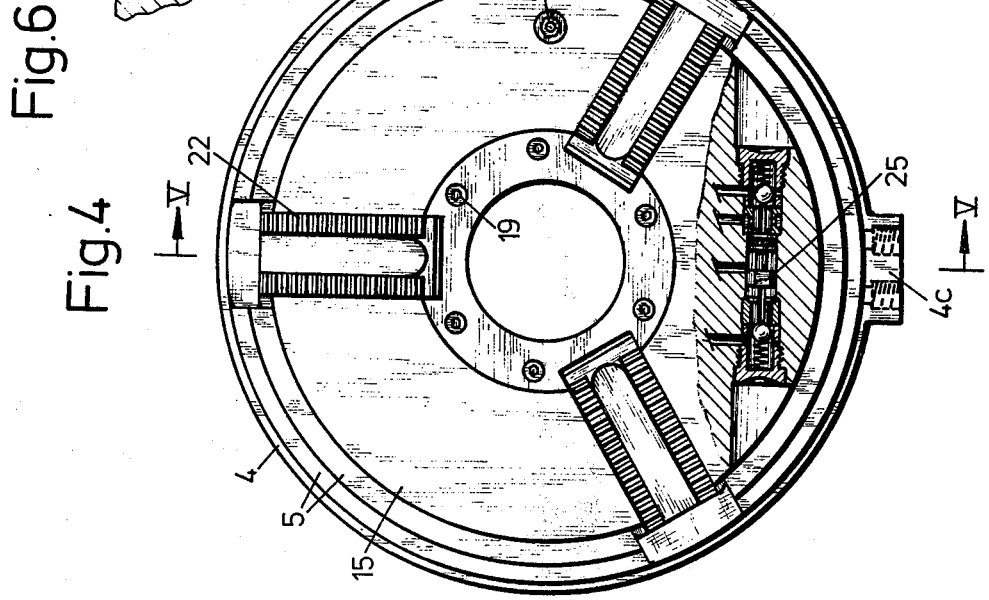

DEVICE FOR FEEDING A PRESSURE MEDIUM TO A ROTATING DOUBLE ACTING PRESSURE CYLINDER FOR ACTUATING CLAMPING TOOLS

This is a continuation of application Ser. No. 298,613-Reich et al, filed Oct. 18, 1972, now abandoned.

The present invention relates to a device for feeding a pressure medium to a rotating double acting pressure cylinder for actuating clamping tools, especially chucks of machine tools. More specifically, the invention relates to a device of this kind which is equipped with a stationary feeding ring mounted on a rotating housing part and provided with an annular diaphragm. This annular diaphragm, which is provided with bores, is adapted, for conveying the pressure medium from an annular chamber on the inside of the annular diaphragm through an annular groove in the housing part and passages to a piston side, sealingly to be pressed during the standstill of the clamping tool in axial direction against an annular surface of the rotating housing part, the annular surface surrounding the annular groove. The annular diaphragm is furthermore adapted, when in pressure-less condition, to return to a contact-free position due to its own resiliency.

A rotating cylinder for compressed air operable chucks for machine tools has become known which has a stationary ring communicating with the air supply and equipped with an axially displaceable annular seal provided with passage means for conveying the pressure medium to the end face of the cylinder, the annular seal being adapted by the inflowing compressed air to be sealingly pressed against the cylinder. This seal is designed as an annular diaphragm which at its rim portions is clamped between two parts of the feeding ring. Inasmuch as the annular diaphragm cooperates with the rear end face of the chuck body, considerable limitations are encountered when connecting the chuck body to the flange of the machine tool spindle. In addition thereto, the heretofore known design is suitable merely for opening the chuck by compressed air against the thrust of springs which generate the clamping force of the chuck.

To avoid the drawbacks of the described heretofore known design and to provide a device for feeding the pressure medium to the double acting pressure cylinder, it is known to mount a stationary feeding ring on the mantle surface of the pressure cylinder and to provide radially compressible sealing rings which, during the pressure medium transfer, will seal the annular gap between the stationary feeding ring and the stopped pressure cylinder, the annular gap being provided between the annular chamber in the feeding ring and the annular groove in the cylinder housing for structural reasons. The employment of such radially compressible sealing rings not only makes it necessary always to provide two sealing rings for each transfer area but also has the drawback that the sealing rings are under considerable load.

It is, therefore, an object of the present invention to provide a device of the general character set forth above which, while employing an annular diaphragm adapted to be axially pressed against an annular surface of the rotating housing part, makes possible a space saving arrangement for the double acting pressure cylinder whereas the device itself is simple in construction and not subjected to heavy loads.

This object and other objects and advantages of the invention will appear more clearly from the following specification in connection with the accompanying drawings in which:

FIG. 1 is an end view of a transfer housing for a pressure cylinder for actuating clamping tools according to the invention.

FIG. 2 represents a longitudinal section through the transfer housing, said section being taken along the line II — II of FIG. 1.

FIG. 3 is a longitudinal section through a portion of the transfer housing, said section being taken along the line III — III of FIG. 1.

FIG. 4 represents a partially sectioned end view of a pressure medium operable chuck with built-in pressure cylinder.

FIG. 5 is a longitudinal section through the chuck of FIG. 4, said section being taken along the line V — V of FIG. 4.

FIG. 6 is a partial section through the feeding ring on a larger scale than that of FIGs. 4 and 5.

The device according to the present invention is characterized primarily in that the feeding ring is of I-shaped cross section and at both sides of its web is provided with a double groove for an annular diaphragm which diaphragm cooperates respectively with one of two annular surfaces located opposite to each other in spaced relationship with regard to each other, the annular surfaces being provided with annular grooves respectively communicating with one of the two piston sides.

According to a further feature of the invention, the feeding ring is arranged substantially in a recess within the rotating housing part.

According to another development of the invention, the feeding ring is mounted directly on a mantle surface of the housing part and is in axial direction guided by an abutment ring which is mounted on the housing part and comprises one of the two annular surfaces for the transfer of the pressure medium. The annular diaphragm is, in conformity with the present invention, loosely inserted into the double groove.

Referring now to the drawings in detail, the transfer housing illustrated in FIGs. 1–3 comprises a housing 1 which is composed of a main housing part 1a and a housing cover 1b, the main housing part and the housing cover being connected to each other by holding screws 2. The housing is by means of connecting screws 3 connected to the housing of the pressure cylinder (not shown in the drawings) which pressure cylinder serves in a suitable manner for actuating a clamping tool, for instance, as described in assignee's co-pending application for "Power Operable Chuck," inventors Josef Steinberger and Heinz Pohl, and based on German Patent Application P 21 50 885.0 filed Oct. 13, 1971. On the housing main part 1a there is mounted a feeding ring 4 of I-shaped cross section.

The feeding ring 4 is at both sides of its web 4a provided with a double groove 4b the grooves of which are respectively of trapezoidal cross section. Furthermore, the feeding ring 4 has a connecting piece 4c in which two conduit connections 6 are arranged. Each of these conduit connections 6 communicates through a bore in web 4a of the feeding ring 4 with an annular chamber 7 which is formed by the web 4a of the feeding ring 4 and an annular diaphragm 9 inserted in the double groove 4b.

The annular diaphragm 9 is provided with a plurality of bores which are distributed over its circumference and cooperate with an annular groove 8 which latter is provided in an annular surface 10. The annular surface 10 is formed in part by the housing cover 1b and in part by the housing main part 1a. The annular groove in the housing cover 1b communicates through passages 11 with an opening in the end face of the housing 1. The passages 11 are to a major extent formed by blind bores which are closed again by threaded closure members 13. The annular groove 8 in the main housing part 1a communicates directly through passages 12 with an opening which adjacent to the first mentioned opening is located in that end face of the housing 1 which is intended for connection to the housing of the non-illustrated pressure cylinder.

While the housing 1 rotates together with the double acting pressure cylinder, the feeding ring 4 which communicates through pressure conduits with a source of a pressure medium is stationary.

For reversing the non-illustrated piston of the pressure cylinder, the clamping tool with the pressure cylinder and the transfer housing illustrated in FIGS. 1–3 is stopped. Thereupon the pressure medium is conveyed through one of the two connecting pieces 4c. The pressure medium then enters the annular chamber 7 and presses the annular diaphragm 9 against the pertaining annular surface 10 so that the gaps provided for structural reasons between the feeding ring 4 and the housing 1 will be sealed. The pressure medium passes through bores in the annular diaphragm 9 into the annular groove 8 from where it passes through passages 11, 12 to one of the two piston sides to bring about a displacement of the piston toward one end of the cylinder. When the piston is to be moved in the opposite direction, fluid is admitted to the other connecting piece 4c, passing through the other chamber 7 and passages 11 to the opposite side of the piston to move it to the opposite end of the cylinder.

While the so far described embodiment of the invention as illustrated in FIGs. 1–3 concerns merely a transfer housing for connection to a pressure cylinder for actuating a clamping tool, the second embodiment of the invention as illustrated in FIGS. 4–6 concerns a pressure medium operable chuck with builtin pressure cylinder. Inasmuch as the design of the feeding ring corresponds to the design described in connection with FIGS. 1–3, the same reference numerals are employed for corresponding parts.

In contrast to the embodiment of FIGS. 1–3, the feeding ring 4 of the embodiment of FIGS. 4–6 is not mounted in an additional housing but is arranged directly in the chuck body 15 of the chuck and is secured by an abutment ring 5 against axial displacement. The chuck body 15 closed by a cover 16 simultaneously forms the housing for the pressure cylinder the piston 17 of which is guided on a guiding bushing 18 which by means of screws 19 is connected to the chuck body 15. The piston 17 is by means of screws 20 screwed to the chuck piston 21 which in a manner known per se cooperates with the main or base jaws 22 of the three-jaw chuck through the intervention of wedge-shaped hooks.

For lubricating the bearing surfaces between the feeding ring 4 of I-shaped cross section and the chuck body 15, there is provided a lubricating nipple 23. FIGS. 4 and 5 further show the securing of the abutment ring 5 by means of a threaded pin 24 and also show a check valve arrangement 25 which is interposed in the passages between the annular grooves 8 and the two cylinder chambers of the pressure cylinder. This check valve provides for entry of fluid pressure medium at one side of piston 17 while the pressure medium is exhausted from the other side, and forms no part of this invention, being shown in the U.S. Pat. to Blattry, No. 3,369,464.

The supply of the pressure medium to one of the two sides of the piston 17 is, in conformity with the embodiment of FIGs. 4–6, effected in the same manner as described in connection with the embodiment of FIGS. 1–3. To this end it is merely necessary to stop the rotation of the chuck.

As will be evident from the above, the designs of the present invention have the advantage that they can be arranged in a space-saving manner within the rotating housing part which latter may either be formed by the housing of the pressure cylinder or by the chuck body of the clamping tool to be actuated. The employment of perforated annular diaphragms adapted to be pressed against an annular surface of a rotating housing part yields the advantage of a low load on the diaphragm during the transfer of the pressure medium. The specific design of the double groove permits a simple and economic design and assembly of the annular diaphragms. The arrangement of the feeding ring substantially within the rotating housing part represents a protected arrangement and simple mounting of the feeding ring.

It is, of course, to be understood that the present invention is, by no means, limited to the particular showing in the drawings but also comprises any modifications within the scope of the appended claims.

What we claim is:

1. A device for feeding fluid pressure medium to opposite sides of a piston in a rotatable double-acting cylinder piston assembly, comprising a rotatable housing member having two annular, spaced radial surfaces, each with a circumferential groove therein, a stationary feeding ring having double-T-form cross section mounted on said rotatable housing member between said radial surfaces with annular radial side walls opposed to and facing said radial surfaces on said housing member, each said side wall having a circumferential channel opening laterally toward the opposed radial surface, an annular diaphragm disk in each channel having passage means therethrough opening toward the circumferential groove in the opposite radial surface, first communicating passages connecting to the grooves in said radial surfaces to convey fluid pressure medium selectively to opposite sides of said cylinder piston assembly to actuate said piston between two end positions, inlet connections on said feeding ring to supply fluid pressure medium selectively to actuate said piston and second communicating passages from each of said inlet connections to a corresponding channel in said feeding ring to supply said medium through said passage means in the diaphragm disk in said channel to the groove in the opposed radial surface and to press said diaphragm disk against said radial surface to seal said passage means and groove.

2. A device according to claim 1, in which each of said channels is formed with undercut grooves in said side walls at the radially inner and outer sides of each channel to form radial flanges overlying the channel to retain said diaphragm in said channel, said fluid pressure medium pressing said diaphragm against said flanges.

3. A device according to claim 1, in which each of said channels has a circumferential groove in the bottom wall of the channel which connects through the passage means to one of the inlet connections.

4. A device in combination according to claim 1, in which each undercut groove has a trapezoidal form in cross section and each diaphragm is pressed into sealing engagement against the outer edges of said grooves.

5. A device for feeding fluid pressure medium to opposite sides of a piston in a rotatable double-acting cylinder piston assembly, comprising a rotatable housing member having two separable parts connected together, each of said parts having an annular, radial surface spaced from and facing the radial surface of the other part, each of said radial surfaces having an annular boss projecting toward the opposite surface and formed with a circumferential groove therein, a stationary feeding ring having double-T-form mounted on said rotatable housing member between said radial surfaces with annular radial side walls opposed to and facing said radial surfaces on said housing member, each side wall having a circumferential channel opening laterally toward the opposed radial surface, each of said channels being formed with undercut grooves in said side walls at the radially inner and outer sides of each channel to form radial flanges overlying the channel, the boss on the opposed radial surface extending between the flanges on the opposite channel, an annular diaphragm disk in each channel having passage means therethrough opening toward the circumferential groove in the boss on the opposite radial surface, first communicating passages connecting to the grooves in the bosses on said radial surfaces to convey fluid pressure medium selectively to opposite sides of the piston of said cylinder piston assembly to actuate said piston between two end positions, inlet connections on said feeding ring to supply fluid pressure medium selectively to actuate said piston, and second communicating passages from each of said inlet connections to a corresponding channel in said feeding ring to supply fluid pressure medium through said passage means in the diaphragm in said channel to the groove in the boss in the opposed radial surface and to press said diaphragm against said boss and the flanges of said channel to seal said passage means on opposite sides of said groove and edges of said channel.

\* \* \* \* \*